(12) United States Patent
Stevens et al.

(10) Patent No.: US 12,228,349 B2
(45) Date of Patent: Feb. 18, 2025

(54) MODULAR INTERCOOLER BLOCK

(71) Applicant: K&N Engineering, Inc., Riverside, CA (US)

(72) Inventors: Matthew Stevens, Riverside, CA (US); Steve Williams, Cherry Valley, CA (US)

(73) Assignee: K&N Engineering, Inc., Riverside, CA (US)

( * ) Notice: Subject to any disclaimer, the term of this patent is extended or adjusted under 35 U.S.C. 154(b) by 0 days.

(21) Appl. No.: 16/275,075

(22) Filed: Feb. 13, 2019

(65) Prior Publication Data

US 2019/0257592 A1 Aug. 22, 2019

Related U.S. Application Data

(60) Provisional application No. 62/632,999, filed on Feb. 20, 2018.

(51) Int. Cl.
*F28F 9/02* (2006.01)
*B21D 53/08* (2006.01)
(Continued)

(52) U.S. Cl.
CPC .............. *F28F 1/126* (2013.01); *B21D 53/08* (2013.01); *B33Y 80/00* (2014.12); *F28D 1/0443* (2013.01);
(Continued)

(58) Field of Classification Search
CPC ..... B21D 53/08; B33Y 80/00; F02B 29/0456; F28D 1/0443; F28D 1/0477;
(Continued)

(56) References Cited

U.S. PATENT DOCUMENTS 3,596,495 A * 8/1971 Huggins ............... F28D 1/0478
72/370.18
4,562,697 A 1/1986 Lawson
(Continued)

FOREIGN PATENT DOCUMENTS

JP WO 2008/123603 10/2008
WO WO-2012 068200 5/2012

OTHER PUBLICATIONS

International Search Report, PCT Application No. PCT/US2019/018091, dated Apr. 15, 2019.

*Primary Examiner* — Len Tran
*Assistant Examiner* — Hans R Weiland
(74) *Attorney, Agent, or Firm* — Rutan & Tucker LLP; Hani Z. Sayed

(57) ABSTRACT

An apparatus and a method are provided for a modular intercooler block that may be fabricated by way of direct metal printing and assembled to form larger intercoolers. The modular intercooler block comprises cooling fins that are spaced between first and second core headers to allow passage of an airstream. Countersunk holes are arranged on the first and second core headers and configured to receive grommets when the first or second core header is fastened to another core header comprising similarly arranged countersunk holes. A core tube extends along an undulating path from each countersunk hole in the first core header, through the multiplicity of cooling fins, to a similar countersunk hole in the second core header. The core tubes may include thin copper walls and spiraled inner passages to enhance heat transfer to the airstream passing through the multiplicity of cooling fins.

13 Claims, 3 Drawing Sheets

(51) Int. Cl.
  *B33Y 80/00* (2015.01)
  *F28D 1/04* (2006.01)
  *F28F 1/00* (2006.01)
  *F28F 1/12* (2006.01)
  *F28F 1/32* (2006.01)

(52) U.S. Cl.
  CPC ............. *F28F 1/006* (2013.01); *F28F 1/32* (2013.01); *F28F 9/0246* (2013.01)

(58) Field of Classification Search
  CPC .. F28D 1/05325; F28D 1/05391; F28F 1/006; F28F 1/025; F28F 1/126; F28F 1/32; F28F 7/02; F28F 9/0246; F28F 9/26; F28F 9/262; F28F 13/08; F28F 13/12; F28F 2009/004; F28F 2210/06; F28F 2255/18; F28F 2280/06
  See application file for complete search history.

(56) References Cited

U.S. PATENT DOCUMENTS

| | | | | |
|---|---|---|---|---|
| 5,052,475 | A * | 10/1991 | Grundy | F28F 1/32 |
| | | | | 165/149 |
| 5,226,235 | A * | 7/1993 | Lesage | F28F 1/32 |
| | | | | 165/149 |
| 7,726,390 | B2 * | 6/2010 | Sucke | F28F 1/08 |
| | | | | 165/177 |
| 8,631,859 | B1 * | 1/2014 | Hettrich | F28F 9/0226 |
| | | | | 165/144 |
| 9,890,692 | B1 | 2/2018 | Turnage | |
| 2002/0014328 | A1 * | 2/2002 | Mitrovic | F28F 1/40 |
| | | | | 165/183 |
| 2006/0196635 | A1 * | 9/2006 | Lesage | F28F 9/14 |
| | | | | 165/76 |
| 2008/0116246 | A1 | 5/2008 | Rigal et al. | |
| 2008/0121387 | A1 | 5/2008 | Taniguchi et al. | |
| 2009/0038778 | A1 * | 2/2009 | Korth | F28F 9/001 |
| | | | | 165/104.14 |
| 2010/0193167 | A1 | 8/2010 | Song et al. | |
| 2011/0011572 | A1 | 1/2011 | Nagurny et al. | |
| 2011/0056668 | A1 | 3/2011 | Taras et al. | |
| 2011/0173813 | A1 | 7/2011 | Tochon et al. | |
| 2012/0111548 | A1 * | 5/2012 | Toparkus | F28F 1/02 |
| | | | | 165/177 |
| 2013/0146247 | A1 * | 6/2013 | Kim | F28D 1/0316 |
| | | | | 165/41 |
| 2014/0360698 | A1 * | 12/2014 | Waldman | B22F 3/1055 |
| | | | | 165/81 |
| 2016/0116218 | A1 | 4/2016 | Shedd et al. | |
| 2016/0146551 | A1 * | 5/2016 | Kolb | F28D 1/0417 |
| | | | | 165/173 |
| 2016/0231064 | A1 * | 8/2016 | Kironn | F28F 1/025 |
| 2017/0010054 | A1 * | 1/2017 | Citti | F28F 9/0229 |
| 2018/0112932 | A1 * | 4/2018 | Turney | F28F 1/12 |
| 2018/0172364 | A1 * | 6/2018 | Liu | F25B 39/00 |
| 2019/0049186 | A1 * | 2/2019 | Yoshimura | F25B 39/00 |
| 2019/0360754 | A1 * | 11/2019 | Yanik | F28D 1/05391 |

\* cited by examiner

MODULAR INTERCOOLER BLOCK

PRIORITY

This application claims the benefit of and priority to U.S. Provisional Application, entitled "Modular Intercooler Block," filed on Feb. 20, 2018 and having application Ser. No. 62/632,999.

FIELD

Embodiments of the present disclosure generally relate to the field of intercoolers. More specifically, embodiments of the disclosure relate to systems and methods for a modular intercooler block that may be assembled into larger intercoolers.

BACKGROUND

Engine cooling radiators and intercoolers used with internal combustion engines in trucks or industry are often quite large. Radiators used with stationary diesel-electric generator sets in particular may include radiator or intercooler cores with an overall size of between 6.0 ft. and 8.0 ft. (1.8 meters to 2.4 meters) on a side, or even larger. Such radiators and intercoolers have typically been made with multiple cores because a single core of such size is difficult to manufacture. Industrial radiators and intercoolers typically are comprised of a cooper/brass soldered construction, wherein solder-coated brass tubes are pushed through holes in a stack of copper fins, which are held in a desired spacing by way of a grooved book jig, to form a core block. The core block may then be baked in an oven to solder the tubes to the fins. Following this, the tube ends may be inserted into brass headers at each end of the core block and soldered, to form a core. In general, the height of such a core is limited by the ability to push long, thin tubes through the holes in the fins, with 48 inches (1.22 m) being roughly a practical maximum. Similarly, the size of a typical book jig limits core widths to about 48 in. (1.22 m).

Automobile and heavy truck manufacturers have long since abandoned costly copper/brass radiator and intercooler construction in favor of controlled atmosphere brazing (CAB) aluminum core construction with plastic tanks. Plastic tank aluminum (PTA) radiators include tabbed aluminum headers that may be crimped onto a plastic radiator tank with an elastomeric gasket between. This type of construction is more automated and produces in a product which is lighter, stronger, and has improved durability compared to copper/brass. Available CAB furnaces, however, limit core size to not larger than about 48 inches square.

There is a need, therefore, for improved intercooler construction that requires far less labor, is more consistent, and uses less costly materials while providing a relatively greater heat transfer efficiency.

SUMMARY

An apparatus and a method are provided for a modular intercooler block that may be fabricated by way of direct metal printing (DMP) and configured to be assembled to form larger intercoolers. The modular intercooler block comprises a multiplicity of cooling fins that are configured to allow passage of an airstream. A first core header and a second core header are disposed on opposite sides of the multiplicity of cooling fins. The multiplicity of cooling fins may be comprised of flat sheets that are parallel and uniformly spaced between the first core header and the second core header. A multiplicity of countersunk holes are arranged on an outwardly-facing surface of each of the first core header and the second core header. The multiplicity of countersunk holes are configured to receive grommets or seals when the first core header or the second core header is fastened to another core header comprising countersunk holes disposed in a similar arrangement. A core tube extends along an undulating path from each of the multiplicity of countersunk holes in the first core header, through the multiplicity of cooling fins, to a similarly disposed countersunk hole in the second core header. The core tubes comprise relatively thin copper walls configured to enhance heat transfer to the airstream passing through the multiplicity of cooling fins. The core tubes may comprise spiraled inner passages configured to increase the available surface area whereby heat may be transferred to the airstream.

In an exemplary embodiment, a modular intercooler block fabricated by way of direct metal printing and configured to be assembled to form larger intercoolers comprises: a multiplicity of cooling fins configured to allow passage of an airstream; a first core header and a second core header disposed on opposite sides of the multiplicity of cooling fins; a multiplicity of countersunk holes arranged on an outwardly-facing surface of each of the first core header and the second core header; and a core tube extending from each of the multiplicity of countersunk holes in the first core header, through the multiplicity of cooling fins, to a similarly disposed countersunk hole in the second core header.

In another exemplary embodiment, the multiplicity of cooling fins are comprised of flat sheets that are parallelly disposed between the first core header and the second core header. In another exemplary embodiment, the multiplicity of cooling fins are uniformly spaced between the first core header and the second core header. In another exemplary embodiment, the multiplicity of cooling fins undergo a sinuous path across a height direction of the modular intercooler block. In another exemplary embodiment, the multiplicity of cooling fins undergo a sinuous path along a width direction of the modular intercooler block.

In another exemplary embodiment, the multiplicity of countersunk holes are arranged into adjacent rows and columns that are alternatingly arranged so as to maximize the number of countersunk holes in the first core header and the second core header. In another exemplary embodiment, the multiplicity of countersunk holes are configured to receive grommets or seals when the first core header or the second core header is fastened to another core header comprising countersunk holes disposed in a similar arrangement.

In another exemplary embodiment, the core tubes each comprises a spiraled inner passage configured to increase the available surface area whereby heat is transferred to the airstream passing through the multiplicity of cooling fins. In another exemplary embodiment, the core tubes each follows an undulating path across the multiplicity of cooling fins, the undulating path of the core tubes being configured to provide a surface area that is greater than the surface area of straight core tubes. In another exemplary embodiment, the undulating path is perpendicular to the direction of an airstream passing through the cooling fins. In another exemplary embodiment, the undulating path is parallel to the direction of an airstream passing through the cooling fins. In another exemplary embodiment, the undulating paths of adjacent core tubes comprise a phase-shift with respect to one another. In another exemplary embodiment, the phase-shift between the undulating paths of adjacent core tubes is 90-degress, and wherein the directions of the undulations are perpendicular to one another.

In an exemplary embodiment, a method for a modular intercooler block fabricated by way of direct metal printing and configured to be assembled to form larger intercoolers comprises: forming a first core header and a second core header, the first core header being substantially identical to the second core header; disposing a multiplicity of countersunk holes on a surface of each of the first core header and the second core header; arranging a multiplicity of cooling fins between the first core header and the second core header, the multiplicity of countersunk holes facing away from the multiplicity of cooling fins; and extending a core tube from each of the multiplicity of countersunk holes in the first core header, through the multiplicity of cooling fins, to a similarly disposed countersunk hole in the second core header.

In another exemplary embodiment, disposing the multiplicity of countersunk holes comprises alternatingly arranging the multiplicity of countersunk holes into adjacent rows and columns that maximize the number of countersunk holes in the first core header and the second core header. In another exemplary embodiment, arranging further comprises spacing the adjacent of the multiplicity of cooling fins such that an airstream may be passed through the multiplicity of cooling fins. In another exemplary embodiment, extending comprises forming an undulating path of each core tube across the multiplicity of cooling fins. In another exemplary embodiment, extending further comprises configuring relatively thin copper walls of the core tubes to enhance heat transfer to an airstream passing through the multiplicity of cooling fins. In another exemplary embodiment, extending further comprises configuring spiraled inner passages of the core tubes to increase an available surface area whereby heat may be transferred to an airstream passing through the multiplicity of cooling fins.

BRIEF DESCRIPTION OF THE DRAWINGS

The drawings refer to embodiments of the present disclosure in which.

Figure 1:
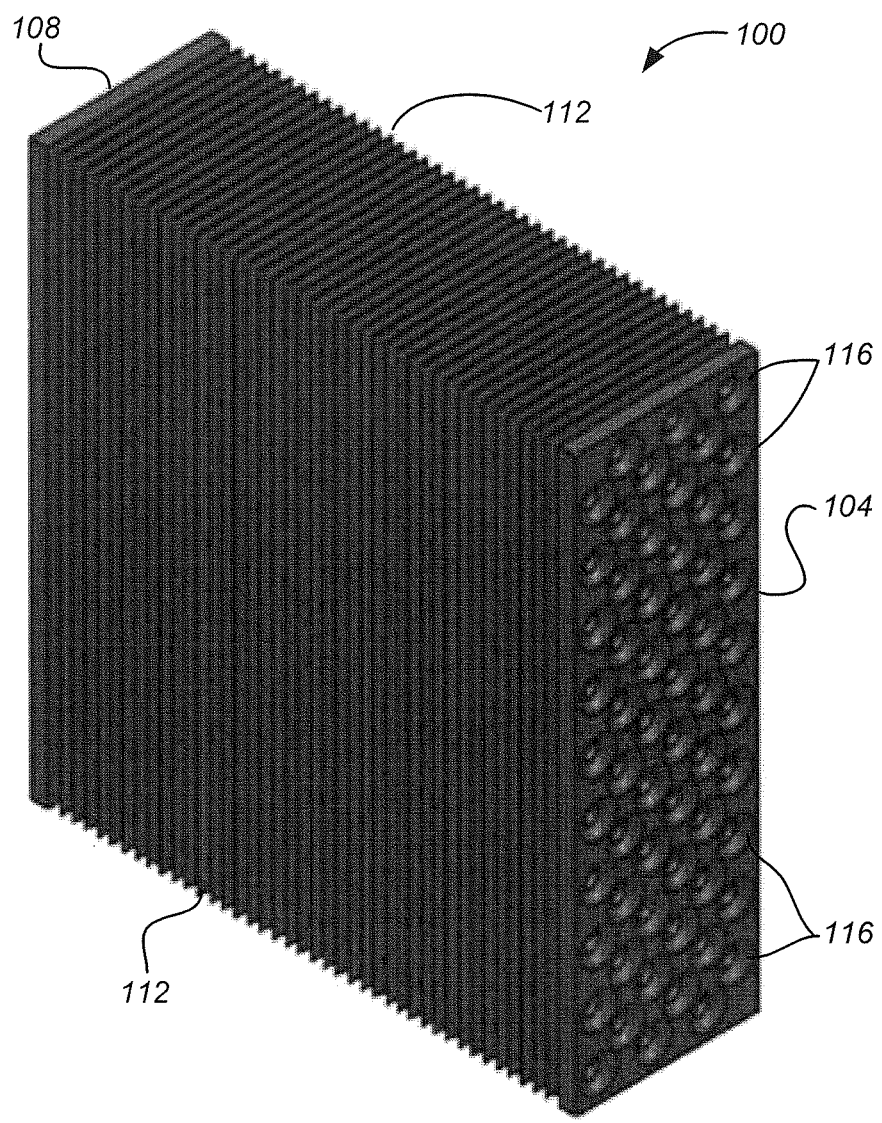
FIG. 1 illustrates an isometric view of an exemplary embodiment of a modular intercooler block.

While the present disclosure is subject to various modifications and alternative foil is, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first header," may be made. However, the specific numeric reference should not be interpreted as a literal sequential order but rather interpreted that the "first header" is different than a "second header." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Engine cooling radiators and intercoolers used with internal combustion engines in trucks or industry are often quite large. Such radiators and intercoolers have typically been made with multiple cores because a single core of such size is difficult to manufacture. Automobile and heavy truck manufacturers have long since abandoned costly copper/brass radiator and intercooler construction in favor of controlled atmosphere brazing (CAB) aluminum core construction with plastic tanks. Plastic tank aluminum (PTA) radiators are lighter, stronger, and more durable than copper/brass radiators, but available CAB furnaces limit core size. There is a need, therefore, for improved intercooler construction that requires far less labor, is more consistent, and uses less costly materials while providing a relatively greater heat transfer efficiency. Embodiments of the present disclosure provide an apparatus and methods for a modular intercooler block that may be assembled into larger intercoolers.

FIG. 1 illustrates an isometric view of an exemplary embodiment of a modular intercooler block 100 that is may be assembled to form larger intercoolers for various applications. The modular intercooler block 100 is comprised of a first core header 104 and a second core header 108 that are disposed on opposite sides of the modular intercooler block. A multiplicity of cooling fins 112 are parallelly disposed between the first and second core headers 104, 108. The multiplicity of cooling fins 112 are uniformly spaced between the first and second core headers 104, 108 so as to allow an airstream to pass through the modular intercooler block 100 during operation.

The first core header 104 and the second core header 108 each includes a multiplicity of countersunk holes 116 arranged on an outwardly-facing surface. As will be recognized, adjacent rows and columns of the countersunk holes 116 are alternatingly arranged so as to maximize the number of countersunk holes in the first and second core headers 104, 108. The countersunk holes 116 preferably are configured to receive grommets or seals when the first or second core header 104, 108 is fastened to another core header comprising countersunk holes disposed in a similar arrangement. For example, grommets may be disposed in each of the countersunk holes 116 between a first core header 104 of a first modular intercooler block 100 and a second core header 108 of a second modular intercooler block. In some embodiments, however, any of various suitable gaskets may be used to seal the countersunk holes 116 between adjoining modular intercooler blocks.

Figure 1A:
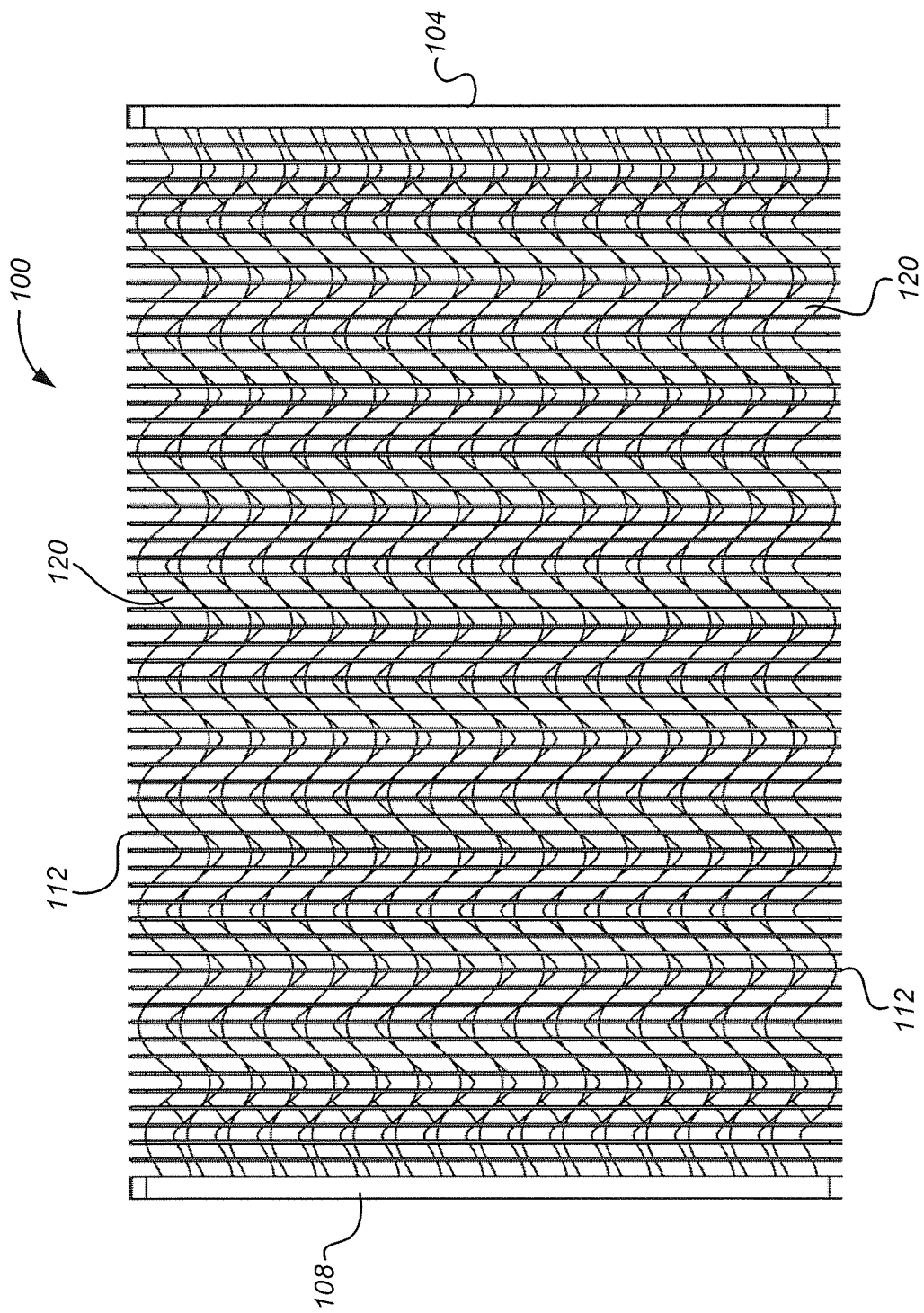
FIG. 1A illustrates a side plan view of an exemplary embodiment of a modular intercooler block.

As best shown in FIG. 1A, a core tube 120 extends from each countersunk hole 116 in the first core header 104, through the cooling fins 112, to a similarly disposed countersunk hole in the second core header 108. In the exemplary embodiment illustrated herein, each of the core tubes 120 follows an undulating path across the core fins 112. The illustrated undulating path is perpendicular to the direction of an airstream passing through the cooling fins 112. As will be appreciated, the undulating path of the core tubes 120 provides a surface area that is greater than the surface area of straight core tubes. Thus, the undulating core tubes 120 are configured to transfer a relatively greater quantity of heat to an airstream passing through the cooling fins 112. It is contemplated that, in other embodiments, the core tubes 120 may be extended along any of various paths through the cooling fins 112, such as, by way of example, undulating parallel to the direction of the airstream, as well as various sinuous and helical paths.

In some embodiments, the undulating paths of adjacent core tubes 120 may be out of phase with one another. For example, in some embodiments, the undulating paths of adjacent core tubes may be 90-degress out of phase, such that the undulations of the adjacent core tubes 120 approach one another. Further, in some embodiments, the undulating paths of the core tubes 120 may be 90-degrees out of phase and the directions of the undulations may be perpendicular to one another. It should be understood, therefore, that the core tubes 120 may be extended along any of various paths, through the cooling fins 112, that are found to advantageous transfer heat to an airstream passing through the modular intercooling block 100.

Moreover, although the cooling fins 112 are shown herein as being essentially parallel planes, the cooling fins should not be construed as being limited to flat planes. It is contemplated that, in some embodiments, the cooling fins 112 may undergo any of various paths across the height direction and/or the width direction of the modular intercooler block 100. In some embodiments, for example, the cooling fins 112 may be disposed in a sinuous path along the height direction of the modular intercooler block 100. In some embodiments, the sinuous paths of the cooling fins 112 may extend along the width direction of the modular intercooler block 100. Although the illustrated cooling fins 112 are shown having a uniform spacing, embodiments of the cooling fins 112 that undulate may include any of various frequencies, amplitudes, and phase-shifts of the undulating paths of adjacent cooling fins, without limitation.

The modular intercooling block 100 may be fabricated by way of direct metal printing (DMP) using any of various suitable 3D printing technologies. It is contemplated that 3D printing enables applying a wide variety of geometric configurations to the modular intercooler block 100 that are not achievable by way of conventional copper/brass manufacturing techniques. For example, 3D printing enables producing thinner walls of the core tubes 120 so as to enable the use of materials that transfer heat more efficiently (e.g., copper), but are generally too heavy when fabricated by way of traditional manufacturing techniques. Further, in some embodiments, 3D printing may enable forming spiraled inner passages of the core tubes 120 so as to increase the available surface area whereby heat may be transferred to the airstream passing through the cooling fins 112. Further still, 3D printing techniques facilitate forming the alternating arrangement of adjacent rows and columns of the core tubes 120, discussed in connection with FIG. 1. The alternating arrangement of the core tubes 120 allows the modular intercooler block 100 to be oriented at an angle with respect to the airstream without compromising heat transfer to the airstream, unlike conventional intercoolers that rely upon being mounted perpendicular to the airstream.

It is contemplated that multiple modular intercooler blocks 100 may be assembled to form larger intercoolers having any desired size. Thus, the modular intercooler block 100 essentially comprises a fundamental intercooler size that may be assembled to fit a variety of intercooler application. For example, one modular intercooler block 100 may be suitable for a motorcycle application, whereas four modular intercooler blocks 100 may be assembled to form an intercooler for an automobile application. Continuing, ten modular intercooler blocks 100 may be assembled together to produce an intercooler for a ¾-ton pickup truck, and sixteen modular intercooler blocks 100 may be assembled to produce an intercooler for a semi-trailer truck. It should be understood, therefore, that the modular intercooler block 100 comprises a universal intercooler size that may be used for any desired application, without limitation.

Figure 2:
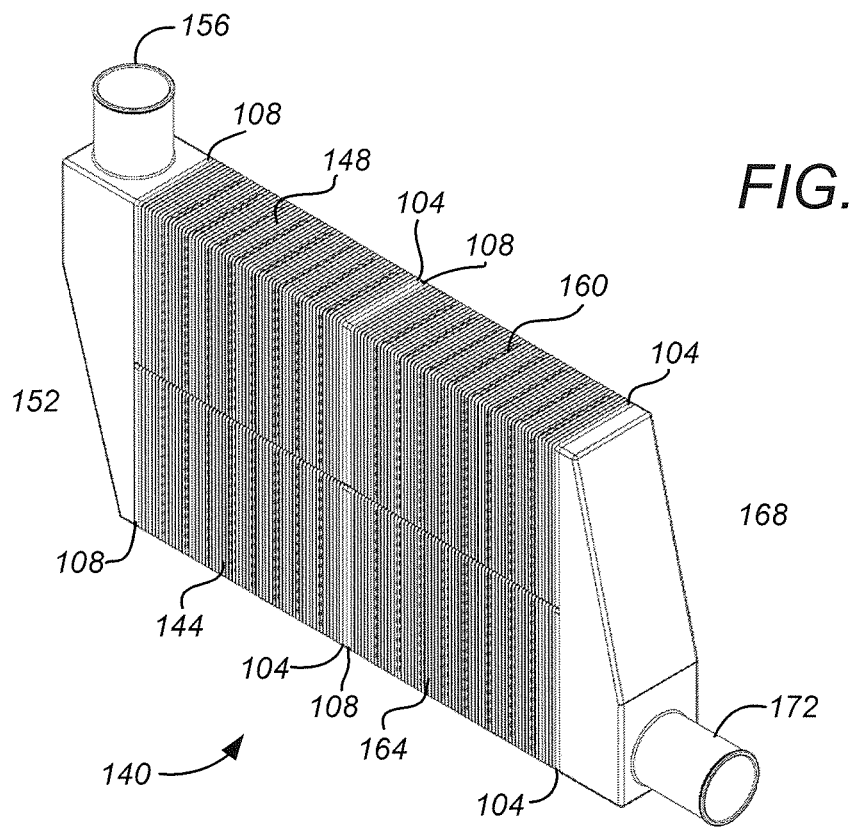
FIG. 2 illustrates an isometric view of an exemplary embodiment of an intercooler assembly comprising the modular intercooler block of FIG. 1.
Figure 3:
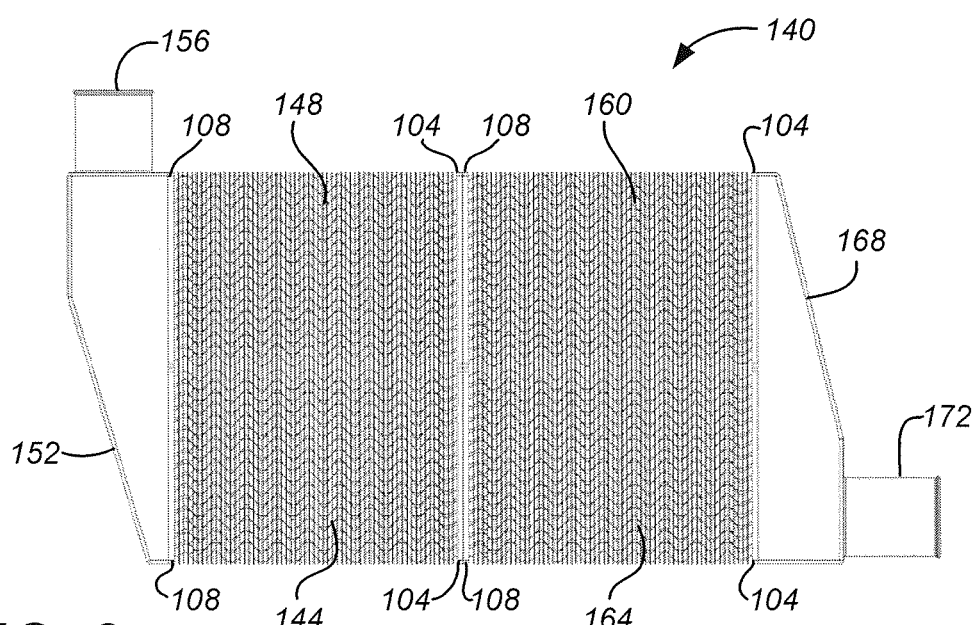
FIG. 3 illustrates a side plan view of the intercooler assembly of FIG. 2.

FIGS. 2-3 illustrate an exemplary embodiment of an intercooler assembly 140 comprised of four modular intercooler blocks 100, shown in FIG. 1, that are coupled together so as to form an intercooler for an exemplary automobile application. The intercooler assembly 140 is comprised of a first intercooler block 144 and a second intercooler block 148 that are fastened to an inlet tank 152. The second intercooler block 148 is stacked on the first intercooler tank 144 such that the second core headers 108 of both blocks are fastened to the inlet tank 152. A suitable gasket preferably is disposed between the inlet tank 152 and the second core headers 108 to ensure a fluid-tight seal therebetween. Any of various suitable techniques may be used to fasten the second core headers 108 onto the inlet tank 152, such that an inlet 156 of the inlet tank is in fluid communication with the countersunk holes 116 of the second headers 108.

As best shown in FIG. 3, a third intercooler block 160 is stacked onto a fourth intercooler block 164, such that the first core headers 104 of both blocks may be fastened to an outlet tank 168. The third and fourth intercooler blocks 160, 164 may be fastened to the outlet tank 168 by way of any suitable technique, whereby an outlet 172 of the outlet tank 168 is in fluid communication with the countersunk holes 116 of the first core headers 104. Preferably, a fluid-tight seal may be maintained between the outlet tank 168 and the first core headers 104 by way of a gasket or other similar device. As will be appreciated, the coupling between the outlet tank 168 and the third and fourth intercooler blocks 160, 164 is substantially similar to the coupling between the inlet tank 152 and the first and second intercooler blocks 144, 148.

With continuing reference to FIGS. 2-3, the first core headers 104 of the first and second intercooler blocks 144, 148 are fastened to the second core headers 108 of the third and fourth intercooler block 160, 164. The countersunk holes 116 of the first core headers 104 are aligned with the countersunk holes of the second core headers 108, such that the inlet 156 is in fluid communication with the outlet 172. As disclosed hereinabove, grommets or other similar components may be disposed in the countersunk holes 116 so as to maintain a fluid-tight seal between the first core headers 104 and the second core headers 108. Any of various suitable techniques may be used to fasten the first core headers 104 to the second core headers 108, without limitation.

As mentioned hereinabove, the intercooler assembly 140 shown in FIGS. 2-3 comprises an intercooler for an exemplary automobile application. Further, relatively large intercoolers may be formed for truck and semi-trailer truck applications by employing techniques that are substantially identical to the techniques disclosed with respect to FIGS. 2-3. It should be understood, therefore, that any size intercooler may be created by assembling a suitable number of modular intercooler blocks 100 and coupling the assembly with suitably-sized inlet and outlet tanks 152, 172, without limitation.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A modular intercooler block, comprising:
   a fabricated direct metal printed and configured modular intercooler block;
   a multiplicity of cooling fins configured to allow passage of an airstream;
   a first core header and a second core header disposed on opposite sides of the multiplicity of cooling fins;
   a multiplicity of first countersunk holes arranged in an alternating row and column configuration on an outwardly-facing surface of the first core header, and a multiplicity of second countersunk holes arranged in an alternating row and column configuration on an outwardly-facing surface of the second core header, wherein the modular intercooler block has a first distance that extends from the outwardly-facing surface of the first core header to the outwardly-facing surface of the second core header, and wherein each of the first and second core headers have an inwardly-facing surface that is opposite to the outwardly-facing surface;
   wherein an inlet of an inlet tank is in fluid communication with the multiplicity of second countersunk holes; and
   a plurality of undulating core tubes directly coupled to the first countersunk holes and the second countersunk holes, each of the plurality of undulating core tubes is extended from each of the multiplicity of first countersunk holes in the first core header through the multiplicity of cooling fins and following an undulating path across the core fins to each of the respective multiplicity of second countersunk holes in the second core header, wherein each of the plurality of undulating core tubes has a second distance that extends from one end to another end that is opposite to the one end, and wherein the first distance is greater than the second distance, wherein the undulation path is such that each of the plurality of undulating core tube tubes extends through each cooling fin only once;
   wherein a phase-shift between the undulating paths of adjacent undulating core tubes is 90 degrees; and
   wherein the second distance is equal to a third distance from the inwardly-facing surface of the first core header to the inwardly-facing surface of the second core header.

2. The modular intercooler block of claim 1, wherein the multiplicity of cooling fins are comprised of flat sheets that are parallelly disposed between the first core header and the second core header.

3. The modular intercooler block of claim 2, wherein the multiplicity of cooling fins are uniformly spaced between the first core header and the second core header.

4. The modular intercooler block of claim 1, wherein the multiplicity of cooling fins undergo a sinuous path across a height direction of the modular intercooler block.

5. The modular intercooler block of claim 1, wherein the multiplicity of cooling fins undergo a sinuous path along a width direction of the modular intercooler block.

6. The modular intercooler block of claim 1, wherein the multiplicity of countersunk holes are configured to receive grommets or seals when the first core header or the second core header is fastened to another core header comprising countersunk holes disposed in a similar arrangement.

7. The modular intercooler block of claim 1, wherein each of the plurality of core tubes each comprises a spiraled inner passage configured to increase the available surface area whereby heat is transferred to the airstream passing through the multiplicity of cooling fins.

8. The modular intercooler block of claim 1, wherein the undulating path of each of the plurality of core tubes is being configured to provide a surface area that is greater than the surface area of straight core tubes.

9. The modular intercooler block of claim 8, wherein the undulating path is perpendicular to the direction of an airstream passing through the cooling fins.

10. The modular intercooler block of claim 8, wherein the undulating path is parallel to the direction of an airstream passing through the cooling fins.

11. A method for a modular intercooler block, comprising:
    fabricating a direct metal printed and configured intercooler block;
    forming a first core header and a second core header, the first core header being substantially identical to the second core header;
    disposing a multiplicity of cooling fins between on a surface of each of the first core header and the second core header;
    arranging a multiplicity of first countersunk holes on an outwardly-facing surface of the first core header in an alternating row and column configuration, and a multiplicity of second countersunk holes arranged in an alternating row and column configuration on an outwardly-facing surface of the second core header, wherein the modular intercooler block has a first distance that extends from the outwardly-facing surface of the first core header to the outwardly-facing surface of the second core header, and wherein each of the first and second core headers have an inwardly-facing surface that is opposite to the outwardly-facing surface; and
    coupling a plurality of core tubes directly coupled to the first countersunk holes and the second countersunk holes;
    wherein an inlet of an inlet tank is in fluid communication with the multiplicity of second countersunk holes; and
    extending each of the plurality of core tubes from each of the multiplicity of first countersunk holes in the first core header, through the multiplicity of cooling fins following an undulating path across the multiplicity of cooling fins, to each of the respective multiplicity of second countersunk holes in the second core header, wherein each of the plurality of core tubes has a second distance that extends from one end to another end that is opposite to the one end and wherein the first distance is greater than the second distance, wherein the undulation path is such that each of the plurality of core tube tubes extends through each cooling fin once and only once;

wherein a phase-shift between the undulating paths of adjacent undulating core tubes is 90 degrees; and wherein the second distance is equal to a third distance from the inwardly-facing surface of the first core header to the inwardly-facing surface of the second core header.

12. The method of claim 11, wherein extending further comprises configuring copper walls of each of the plurality of core tubes to enhance heat transfer to an airstream passing through the multiplicity of cooling fins.

13. The method of claim 11, wherein extending further comprises configuring spiraled inner passages of each of the plurality of core tubes to increase an available surface area whereby heat may be transferred to an airstream passing through the multiplicity of cooling fins.

* * * * *